(12) United States Patent
Cherepinsky et al.

(10) Patent No.: US 10,565,887 B2
(45) Date of Patent: Feb. 18, 2020

(54) FLIGHT INITIATION PROXIMITY WARNING SYSTEM

(71) Applicant: SIKORSKY AIRCRAFT CORPORATION, Stratford, CT (US)

(72) Inventors: Igor Cherepinsky, Sandy Hook, CT (US); Christopher Stathis, Hamden, CT (US); Joshua M. Leland, Milford, CT (US); Matthew Zywiak, Middlefield, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 215 days.

(21) Appl. No.: 15/557,249

(22) PCT Filed: Mar. 10, 2016

(86) PCT No.: PCT/US2016/021785
§ 371 (c)(1),
(2) Date: Sep. 11, 2017

(87) PCT Pub. No.: WO2016/149037
PCT Pub. Date: Sep. 22, 2016

(65) Prior Publication Data
US 2018/0053427 A1 Feb. 22, 2018

Related U.S. Application Data

(60) Provisional application No. 62/133,603, filed on Mar. 16, 2015.

(51) Int. Cl.
*G08G 5/00* (2006.01)
*G01S 13/93* (2006.01)
(Continued)

(52) U.S. Cl.
CPC ............ *G08G 5/0065* (2013.01); *G01S 13/86* (2013.01); *G01S 13/9303* (2013.01);
(Continued)

(58) Field of Classification Search
CPC .. G08G 5/0065; G08G 5/0013; G08G 5/0021; G08G 5/0069; G08G 5/0078;
(Continued)

(56) References Cited

U.S. PATENT DOCUMENTS

| 5,581,250 A | 12/1996 | Khvilivitzky |
| 8,511,606 B1 * | 8/2013 | Lutke ................... B64C 39/028 |
| | | 244/100 R |

(Continued)

FOREIGN PATENT DOCUMENTS

EP 2749984 A2 7/2014

OTHER PUBLICATIONS

PCT/US2016/021785 ISR/WO, Issued Jun. 9, 2016, 14 pages.
Extended European Search Report; EP 16765463.1, dated Nov. 13, 2018; 6 pages.

*Primary Examiner* — Nicholas Kiswanto
(74) *Attorney, Agent, or Firm* — Cantor Colburn LLP

(57) ABSTRACT

According to an aspect of the invention, a method of flight initiation proximity warning for an autonomous vehicle is provided. A flight initiation request is detected at a processing system of the autonomous vehicle. A preflight proximity scan is performed for any obstacles within a predetermined distance from the autonomous vehicle based on the flight initiation request. An alert is sent to a control station based on detecting at least one obstacle within the predetermined distance. Flight initiation of the autonomous vehicle is inhibited until an acknowledgement of the alert is received at the processing system of the autonomous vehicle.

11 Claims, 3 Drawing Sheets

(51) Int. Cl.
  *G08G 5/04* (2006.01)
  *G05D 1/00* (2006.01)
  *G01S 13/02* (2006.01)
  *G01S 13/86* (2006.01)
  *G05D 1/06* (2006.01)
(52) U.S. Cl.
  CPC ......... *G05D 1/0011* (2013.01); *G05D 1/0055* (2013.01); *G05D 1/0669* (2013.01); *G08G 5/0013* (2013.01); *G08G 5/0021* (2013.01); *G08G 5/0069* (2013.01); *G08G 5/0078* (2013.01); *G08G 5/045* (2013.01); *G01S 2013/0245* (2013.01)
(58) Field of Classification Search
  CPC ..... G08G 5/045; G01S 13/86; G01S 13/9303; G01S 2013/0245; G05D 1/0011; G05D 1/0055; G05D 1/0669
  See application file for complete search history.

(56) References Cited

U.S. PATENT DOCUMENTS

| | | | | |
|---|---|---|---|---|
| 9,132,913 | B1* | 9/2015 | Shapiro | B64C 19/00 |
| 9,540,121 | B2* | 1/2017 | Byers | B64C 39/024 |
| 9,650,133 | B2* | 5/2017 | Fisher | B64F 1/12 |
| 2002/0173904 | A1 | 11/2002 | Dow | |
| 2005/0134426 | A1 | 6/2005 | Mullet et al. | |
| 2009/0295622 | A1 | 12/2009 | Anderson et al. | |
| 2010/0109936 | A1* | 5/2010 | Levy | G08G 5/0013 342/30 |
| 2011/0267183 | A1 | 11/2011 | Mckethan | |
| 2012/0072058 | A1 | 3/2012 | Regmi | |
| 2013/0321169 | A1 | 12/2013 | Bateman et al. | |
| 2014/0062755 | A1 | 3/2014 | Kabrt et al. | |
| 2015/0239578 | A1* | 8/2015 | McGeer | B64F 1/02 244/110 R |
| 2017/0124885 | A1* | 5/2017 | Patterson | B64C 39/024 |

* cited by examiner

FLIGHT INITIATION PROXIMITY WARNING SYSTEM

CROSS REFERENCE TO RELATED APPLICATIONS

This application is a National Stage application of PCT/US2016/021785, filed Mar. 10, 2016, which claims the benefit of U.S. Provisional Application No. 62/133,603, filed Mar. 16, 2015, both of which are incorporated by reference in their entirety herein.

BACKGROUND OF THE INVENTION

The subject matter disclosed herein generally relates to autonomous vehicle control, and more particularly to a flight initiation proximity warning system for an autonomous vehicle.

Optionally-piloted vehicles (OPVs) and unmanned aerial vehicles (UAVs) can operate without a human pilot using autonomous controls. As OPVs and UAVs become more prevalent, they are being operated in less restricted and controlled areas. When OPVs and UAVs are operated autonomously in flight, they typically use a perception sensing system to identify and avoid obstacles that may impede safe travel. OPVs and UAVs may operate in modes where they are permitted to initiate a flight autonomously, or are commanded to initiate flight by a remote user who does not have complete awareness of the operating area. This presents a possible safety hazard if personnel are in the vicinity of the vehicle when flight is initiated.

BRIEF DESCRIPTION OF THE INVENTION

According to an aspect of the invention, a method of flight initiation proximity warning for an autonomous vehicle is provided. A flight initiation request is detected at a processing system of the autonomous vehicle. A preflight proximity scan is performed for any obstacles within a predetermined distance from the autonomous vehicle based on the flight initiation request. An alert is sent to a control station based on detecting at least one obstacle within the predetermined distance. Flight initiation of the autonomous vehicle is inhibited until an acknowledgement of the alert is received at the processing system of the autonomous vehicle.

In addition to one or more of the features described above or below, or as an alternative, further embodiments could include where the preflight proximity scan is performed by one or more sensors of a perception sensing system of the autonomous vehicle.

In addition to one or more of the features described above or below, or as an alternative, further embodiments could include where the perception sensing system captures one or more of an image or range to the at least one obstacle as obstacle data, and the method further includes reporting the obstacle data to the control station.

In addition to one or more of the features described above or below, or as an alternative, further embodiments could include identifying an estimated position of the at least one obstacle relative to an orientation of the autonomous vehicle based on which of the one or sensors detect the at least one obstacle, and sending the estimated position of the at least one obstacle to the control station.

In addition to one or more of the features described above or below, or as an alternative, further embodiments could include storing a record of the at least one obstacle in a world model for a path planner of the autonomous vehicle to modify a path plan of the autonomous vehicle based on the at least one obstacle.

In addition to one or more of the features described above or below, or as an alternative, further embodiments could include where the predetermined distance is defined by a sensing range of at least one of the one or more sensors of the perception sensing system or a minimum safe distance defined between the autonomous vehicle and any obstacle.

In addition to one or more of the features described above or below, or as an alternative, further embodiments could include where the flight initiation request is received from the control station or a vehicle computer system of the autonomous vehicle.

In addition to one or more of the features described above or below, or as an alternative, further embodiments could include where the autonomous vehicle is an unmanned vertical takeoff and landing aircraft.

According to further aspects of the invention, a system is provided for a flight initiation proximity warning of an autonomous vehicle. The system includes a processing system and memory having instructions stored thereon that, when executed by the processing system cause the system to detect a flight initiation request. A preflight proximity scan is performed for any obstacles within a predetermined distance from the autonomous vehicle based on the flight initiation request. An alert is sent to a control station based on detecting at least one obstacle within the predetermined distance. Flight initiation of the autonomous vehicle is inhibited until an acknowledgement of the alert is received at the processing system of the autonomous vehicle.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a flight initiation proximity warning for an autonomous vehicle, such as an unmanned vertical takeoff and landing (VTOL) aircraft, is provided. A perception sensing system of the vehicle can include a number of perception sensors, such as cameras, RADAR, ultrasonic sensors, LIDAR, and the like, to provide an indication of the presence of structures or moving objects as one or more obstacle in close proximity to the vehicle. Based on detecting at least one obstacle within a predetermined distance, an alert can be sent from the vehicle to a control station that is manned by a human operator. Flight initiation of the vehicle can remain inhibited until an acknowledgement of the alert is received at the vehicle. Thus, an informed decision can be made by the human operator to proceed with flight or perform another action, e.g., taxi the vehicle to another location, before flight is initiated. The human operator may delay flight until the obstacle is removed or it is determined that the obstacle is not actually a safety concern, e.g., a low-lying shrub, cardboard box, etc.

Although described herein with respect to an autonomous VTOL aircraft, the flight initiation proximity warning system can be implemented on a variety of vehicles. For example, the flight initiation proximity warning system may be implemented in whole or in part within autonomous aircraft, such as optionally-piloted vehicles (OPVs) and unmanned aerial vehicles (UAVs), and/or may be provided to assist a human-piloted aircraft. Furthermore, a proximity warning prior to movement of a vehicle can be implemented in any type of vehicle, including an aircraft, watercraft, spacecraft, or land vehicle.

Figure 1:
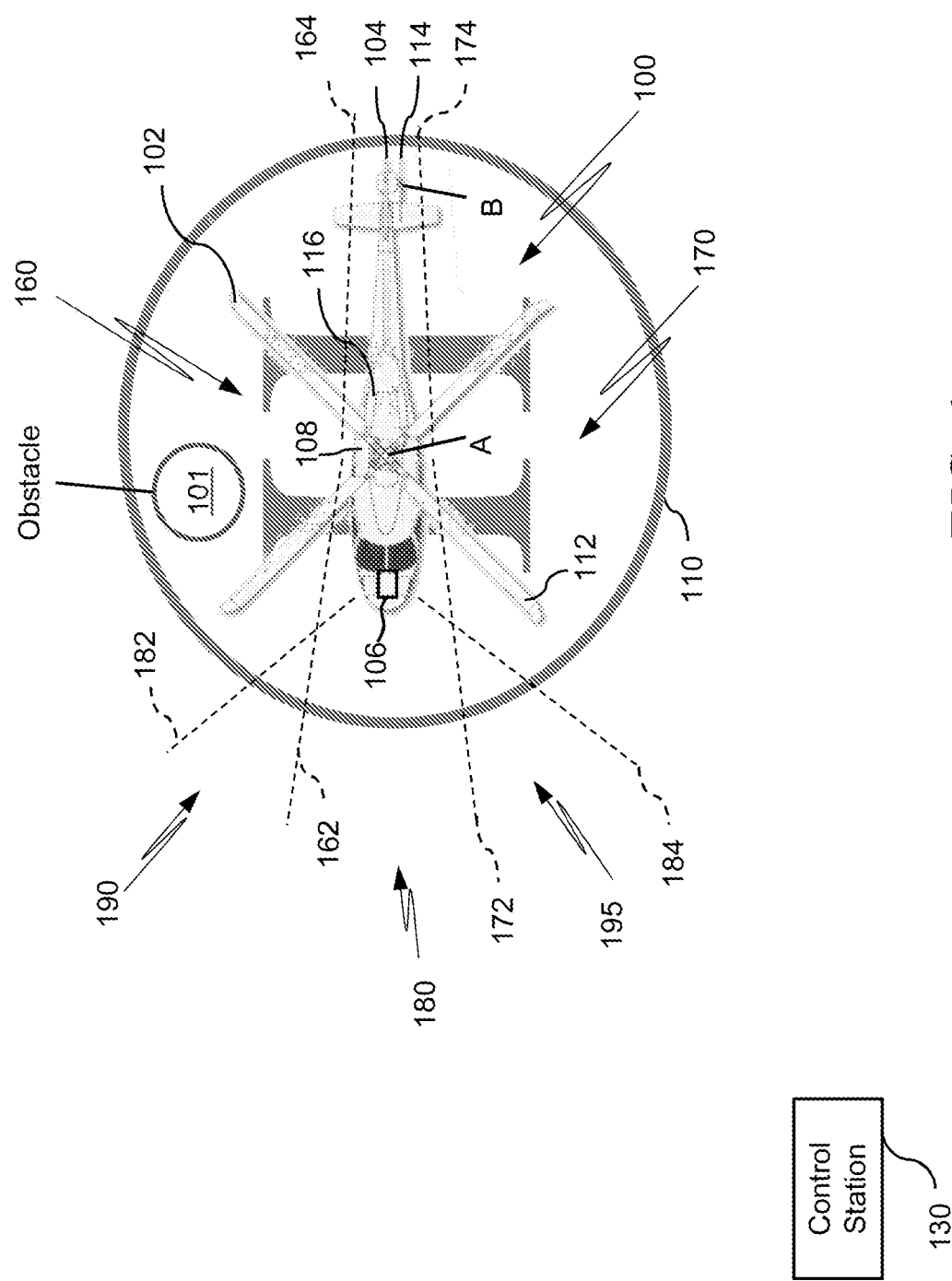
FIG. 1 is a perspective view of an exemplary rotary wing autonomous aircraft according to an embodiment of the invention.
Figure 2:
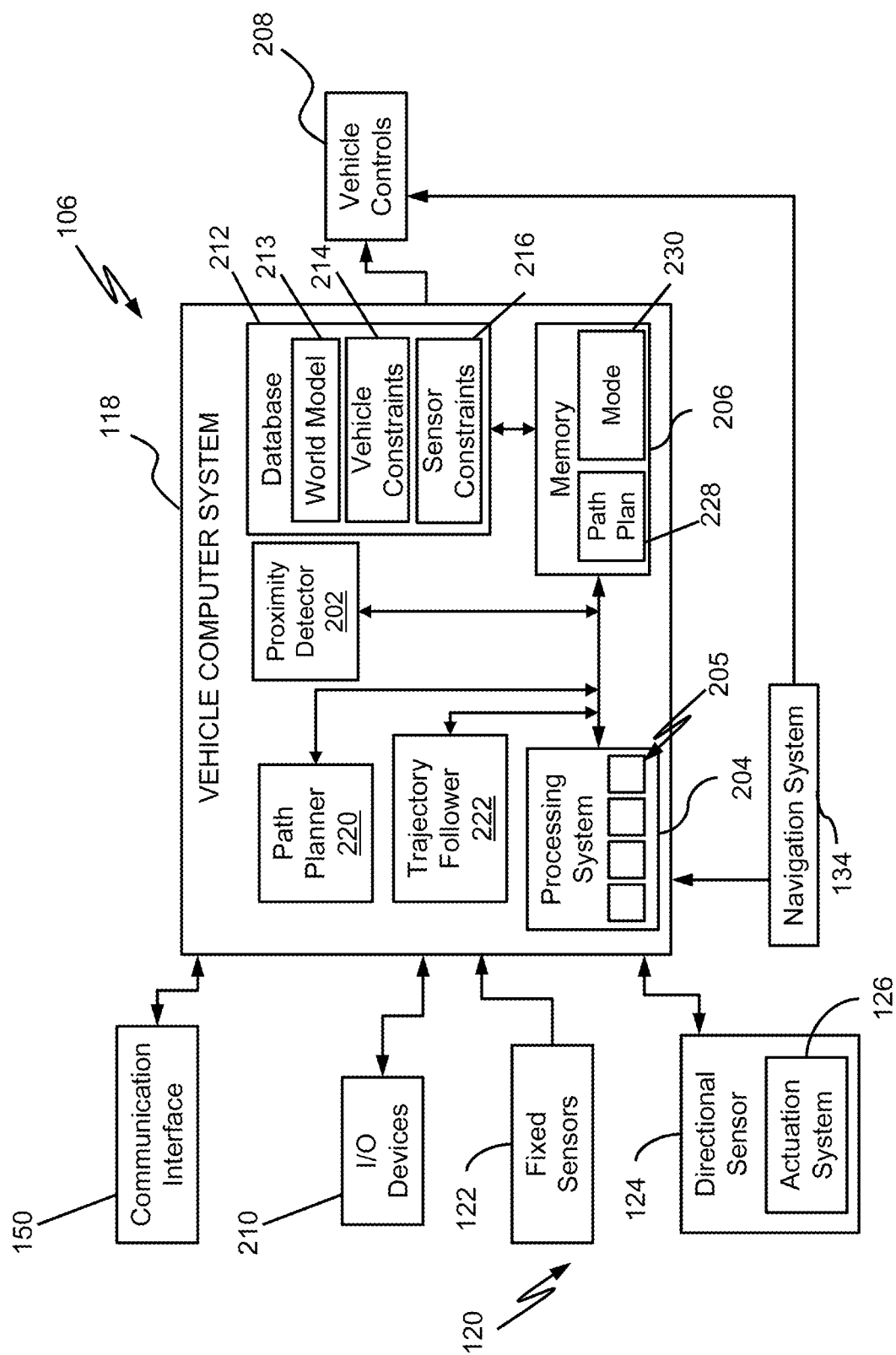
FIG. 2 is a schematic view of an exemplary computing system according to an embodiment of the invention.

Referring now to FIGS. 1 and 2, a perspective view of an exemplary vehicle is illustrated in the form of an autonomous rotary-wing VTOL vehicle 100 (also referred to as "autonomous vehicle 100" or "aircraft 100") for implementing flight initiation proximity warning according to an embodiment of the invention. As illustrated, the autonomous vehicle 100 is an aircraft that includes a main rotor system 102, an anti-torque system, for example, a tail rotor system 104, and a vehicle management system 106. The main rotor system 102 is attached to an airframe 108 and includes a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous vehicle 100 is illustrated as a rotary wing VTOL aircraft and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) for docking, parking, or autonomous positioning may also benefit from embodiments disclosed.

The vehicle management system 106 includes a vehicle computer system 118 having one or more processing resources and memory to process sensor data acquired from a perception sensing system 120. The perception sensing system 120 may be attached to or incorporated within the airframe 108. The perception sensing system 120 may include one or more fixed sensors 122 and directional sensor 124. The fixed sensors 122 refer to statically positioned sensors that are not physically or electronically adjusted, and thus have a fixed field of view. An actuation system 126 can be used to change a position and/or orientation of the directional sensor 124 in embodiments that are physically adjusted. For a directional sensor 124 that is electronically aimed, such as phased array radar, the actuation system 126 can be omitted. For example, phased array radar can electrically vary an effective radiation pattern such that radiation is reinforced in a desired direction and suppressed in undesired directions without mechanical actuation. The vehicle computer system 118 processes, in one non-limiting embodiment, raw data acquired through the perception sensing system 120 while the autonomous vehicle 100 is statically located at landing site 110 before flight initiation. The perception sensing system 120 may also be used during flight of the autonomous vehicle 100.

In an embodiment, the fixed sensors 122 and/or directional sensor 124 may be one or more of: a LIDAR scanner, a video camera, a multi-spectral camera, a stereo camera system, a structure light-based 3D/depth sensor, a time-of-flight camera, a LADAR scanner, a RADAR scanner, an ultrasonic sensor, a phased array sensor, or the like in order to capture sensor data within a field of view. Multiple fields of view can be established about the perimeter of the autonomous vehicle 100 using perception sensing system 120 to scan for any obstacles 101 within a predetermined distance from the autonomous vehicle 100. The predetermined distance may be defined to a establish a minimum safe distance between the autonomous vehicle 100 and any obstacle 101 based on vehicle constraints 214, such as vehicle length, vehicle width, diameter of the main rotor system 102, etc., and/or upon sensor constraints 216 of the perception sensing system 120, e.g., a sensing range of at least one of the directional and/or fixed sensors 124, 122 of the perception sensing system 120. For example, a given sensor 122, 124 may only have a sensing range of about 25 meters for a short-range capable sensor.

In the example of FIG. 1, a right-lateral field of view 160 is defined between a forward-right-lateral limit 162 and a rear-right-lateral limit 164. A left-lateral field of view 170 is defined between a forward-left-lateral limit 172 and a rear-left-lateral limit 174. A forward field of view 180 is defined between a forward-right limit 182 and a forward-left limit 184. Overlapping fields of view may exist such as a forward-right field of view 190 between the forward-right-lateral limit 162 and the forward-right limit 182, and a forward-left field of view 195 between the forward-left-lateral limit 172 and the forward-left limit 184. Thus, even for lower precision sensors of the perception sensing system 120, an estimated position of obstacle 101 can be identified relative to the orientation of the autonomous vehicle 100 based on which of the sensors 122, 124 detects the obstacle 101. For example, a sensor or sensors that establish the right-lateral field of view 160 can be used to estimate that the obstacle 101 is located to the right of the autonomous vehicle 100. Since the obstacle 101 is not also detected within the forward field of view 180, the position estimate can be refined to a location between the forward-right limit 182 of the forward field of view 180 and the rear-right-lateral limit 164 of the right-lateral field of view 160.

Additionally, the autonomous vehicle 100 may include a navigation system 134, such as, for example, an inertial measurement unit (IMU) that may be used to acquire positional data related to a current rotation and acceleration of the autonomous vehicle 100 in order to determine a geographic location of autonomous vehicle 100, including a change in position of the autonomous vehicle 100. The navigation system 134 can also or alternatively include a global positioning system (GPS) or the like to enhance positional awareness of the autonomous vehicle 100. The navigation system 134 in combination with the sensor data may be used to determine a path plan 228 for a trajectory of the autonomous vehicle 100.

Sensor data from the perception sensing system 120 may also be relayed to control station 130 via a communication interface 150. The control station 130 may include any type of processor and memory to hold instructions in a non-transitory form for execution, and a user interface to send and receive data from the autonomous vehicle 100. The control station 130 may be located at a physically remote location with respect to the autonomous vehicle 100 such that an operator of the control station 130 cannot directly observe the surrounding environment of the autonomous vehicle 100. In embodiments, a proximity detector 202 of the vehicle computer system 118 performs a preflight proximity scan for any obstacles 101 within a predetermined distance from the autonomous vehicle 100 based on a flight initiation request from the control station 130, the vehicle computer system 118, or other vehicle computer system (not depicted) of the autonomous vehicle 100. The proximity detector 202 can also send an alert to the control station 130 based on detecting at least one obstacle 101 within the predetermined distance and can inhibit flight initiation of the autonomous vehicle 100 until an acknowledgement of the alert is received from the control station 130.

The vehicle computer system 118 executes instructions for implementing the proximity detector 202 and may also execute instructions for implementing a path planner 220 and a trajectory follower 222, as well as other functions (not depicted). The vehicle computer system 118 receives sensor data indicative of current conditions using the perception sensing system 120, including one or more fixed sensors 122 and a directional sensor 124 that may include the actuation system 126. As depicted in FIG. 2, the vehicle computer system 118 includes a memory 206 that communicates with a processing system 204. The memory 206 may store the proximity detector 202, path planner 220 and/or trajectory follower 222 as executable instructions that are executed by the processing system 204. The memory 206 is an example of a non-transitory computer readable storage medium tangibly embodied in the vehicle computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. Accordingly, the memory 206 may also hold various data values, such as a path plan 228, a mode 230, and/or other values to support vehicle trajectory and proximity detection. The path plan 228 can be received and stored in the memory 206 as created locally by the path planner 220 in view of world model 213 or received remotely via the communication interface 150. The proximity detector 202 can be responsive to the mode 230 in view of the path plan 228 with respect to vehicle constraints 214 and sensor constraints 216. For example, the mode 230 may indicate a flight initiation request as a preflight check request triggered by the trajectory follower 222 implementing the path plan 228 or a request from the control station 130. The mode 230 may transition between idle, preflight check, initiate flight, in-flight, landing, and other states.

The processing system 204 may include any number and type of processors, including a general purpose processor, a digital signal processor, a microcontroller, an application specific integrated circuit, a field programmable gate array, or the like. In an exemplary embodiment, the processing system 204 includes a plurality of processing resources 205, which may be separate cores, processing circuits, and/or processors supporting parallel computing. Although depicted as singular blocks, the processing system 204 and memory 206 can be distributed between multiple processing circuits and memory subsystems. In an embodiment, the processing system 204 performs additional processing tasks for the vehicle management system 106.

The vehicle management system 106 may include a database 212 to store a variety of values, such as the world model 213, the vehicle constraints 214, the sensor constraints 216, and the like. The world model 213 defines known locations of obstacles 101 and other structures that may be encountered on the ground or in-flight as collected by the perception sensing system 120 in combination with the navigation system 134. The path planner 220 can use the world model 213 to create and adjust the path plan 228. The world model 213 may also be updated via an upload from an external source, such as the control station 130 or other vehicle. The vehicle constraints 214 may define a variety of limits associated with flight dynamics and limits of maneuverability of the autonomous vehicle 100 of FIG. 1. The sensor constraints 216 can define features such as field of view and range capabilities of sensors 122, 124. For example, the directional sensor 124 may support a scanning mode between a pair of angular positions as endpoints defined relative to a reference frame of the autonomous vehicle 100 of FIG. 1, where the angular positions may be constrained by the actuation system 126 and/or structural features of the autonomous vehicle 100.

The vehicle management system 106 may provide one or more controls, such as vehicle controls 208. The vehicle controls 208 may provide directives based on, e.g., data associated with the navigation system 134. Trajectory follower 222 can interface with the navigation system 134 and the path plan 228 to provide higher-level directives to the vehicle controls 208 that are translated into lower-level directives for engine controls, rotor controls, and the like. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust the constraints 214, 216 and relationships between the path plan 228 and mode 230. It is to be appreciated that the vehicle management system 106 is illustrative. In some embodiments, additional components or entities not shown in FIG. 2 may be included. In some embodiments, one or more of the components or entities may be optional. In some embodiments, the components or entities of the vehicle management system 106 may be arranged or configured differently from what is shown in FIG. 2. For example, in some embodiments the I/O device(s) 210 may be commanded by vehicle controls 208, as opposed to being commanded by the processing system 204.

Figure 3:
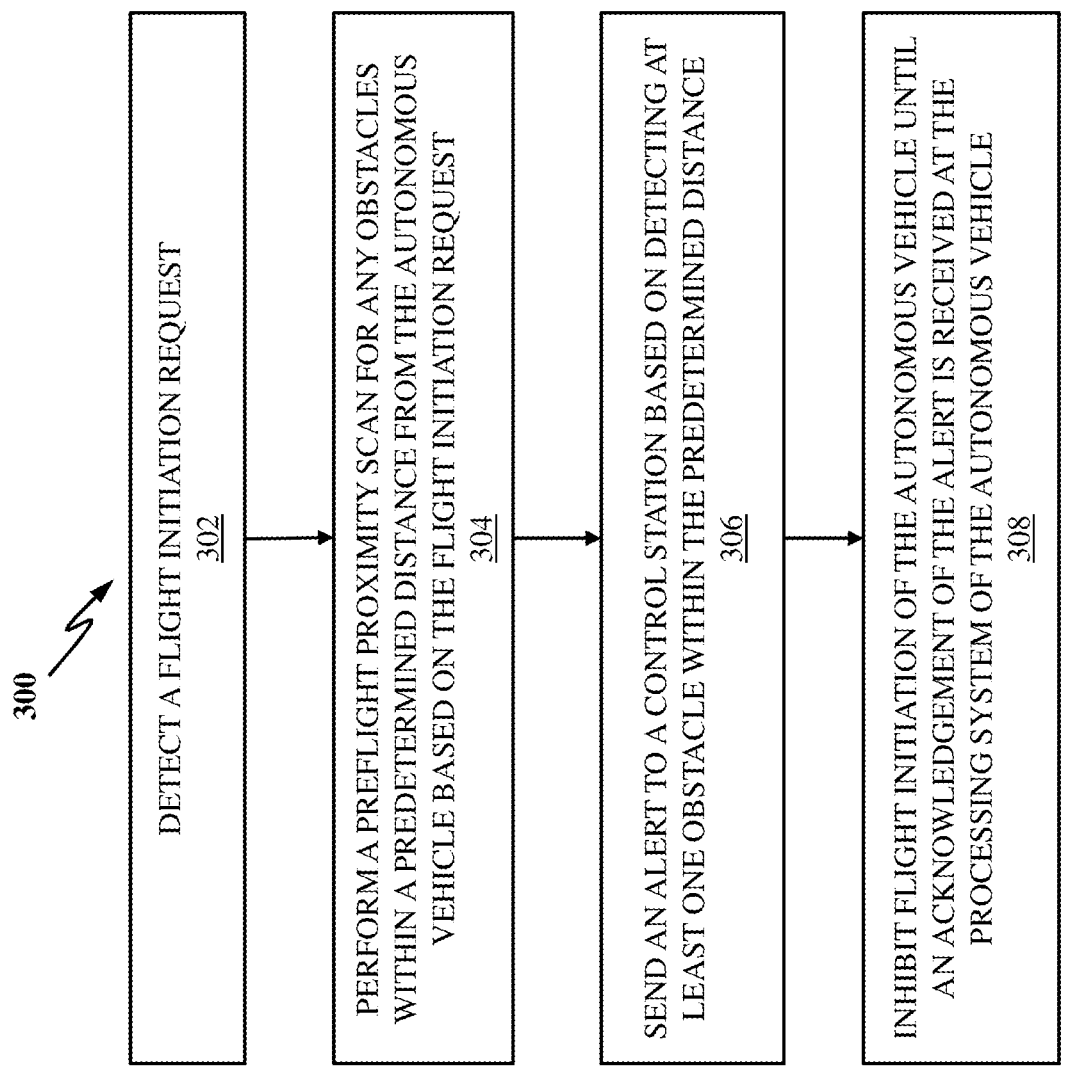
FIG. 3 illustrates a process flow diagram for a flight initiation proximity warning for an autonomous vehicle according to an embodiment of the invention.

FIG. 3 illustrates an exemplary process flow diagram 300 that can be performed by the processing system 204 of FIG. 2 in combination with one or more other controls or systems with continued reference to FIGS. 1 and 2. At block 302, a flight initiation request is detected at the processing system 204 of the autonomous vehicle 100. The flight initiation request may be received from the control station 130 or vehicle computer system 118 of the autonomous vehicle 100.

At block 304, a preflight proximity scan is performed for any obstacles 101 within a predetermined distance from the autonomous vehicle 100 based on the flight initiation request. The preflight proximity scan can be performed by one or more sensors 122, 124 of the perception sensing system 120 of the autonomous vehicle 100. The perception sensing system 120 can capture one or more of an image or range to the at least one obstacle 101 as obstacle data. An estimated position of the at least one obstacle 101 can be identified relative to an orientation of the autonomous vehicle 100 based on which of the one or sensors 122, 124 detect the at least one obstacle 101. A record of the at least one obstacle 101 may also be stored in the world model 213 for path planner 220 of the autonomous vehicle 100 to modify the path plan 228 of the autonomous vehicle 100 based on the at least one obstacle 101.

At block 306, an alert is sent to control station 130 based on detecting at least one obstacle 101 within the predetermined distance. The predetermined distance may be defined by a sensing range of at least one of the one or more sensors 122, 124 of the perception sensing system 120 or a minimum safe distance defined between the autonomous vehicle 100 and any obstacle 101. The alert may include reporting of the obstacle data to the control station 130, such as images, estimated distances, and the like. The estimated position of the at least one obstacle 101 may also be sent to the control station 130.

At block 308, flight initiation of the autonomous vehicle 100 is inhibited until an acknowledgement of the alert is received at the processing system 204 of the autonomous vehicle 100. The proximity detector 202 can hold the mode 230 in a preflight state until an acknowledgement from the control station 130 is received. Upon acknowledgement, the mode 230 may transition to allow the main rotor system 102 to turn on and the trajectory follower 222 to control flight of the autonomous vehicle 100 according to the path plan 228.

Technical effects include interlocking flight initiation of an autonomous vehicle with obstacle detection performed by a system of the vehicle. Embodiments include an additional layer of safety to the operation of autonomous aircraft, especially in situations where aircraft land and takeoff in busy areas.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for a flight initiation proximity warning for an autonomous vehicle, the method comprising:
   detecting a flight initiation request at a processing system of the autonomous vehicle;
   performing a preflight proximity scan with one or more sensors of a perception sensing system of the autonomous vehicle to detect any obstacles within a predetermined distance from the autonomous vehicle based on the flight initiation request;
   sending an alert to a control station based on detecting at least one obstacle within the predetermined distance;
   identifying an estimated position of the at least one obstacle relative to an orientation of the autonomous vehicle based on which of the one or sensors detect the at least one obstacle;
   sending the estimated position of the at least one obstacle to the control station; and
   inhibiting flight initiation of the autonomous vehicle until an acknowledgement of the alert is received at the processing system of the autonomous vehicle.

2. The method of claim 1, wherein the perception sensing system captures one or more of an image or range to the at least one obstacle as obstacle data, and the method further comprises reporting the obstacle data to the control station.

3. The method of claim 1, further comprising:
   storing a record of the at least one obstacle in a world model for a path planner of the autonomous vehicle to modify a path plan of the autonomous vehicle based on the at least one obstacle.

4. The method of claim 1, wherein the predetermined distance is defined by a sensing range of at least one of the one or more sensors of the perception sensing system or a minimum safe distance defined between the autonomous vehicle and any obstacle.

5. The method of claim 1, wherein the flight initiation request is received from the control station or a vehicle computer system of the autonomous vehicle.

6. The method of claim 1, wherein the autonomous vehicle is an unmanned vertical takeoff and landing aircraft.

7. A system for a flight initiation proximity warning of an autonomous vehicle, the system comprising:
   a processing system; and
   memory having instructions stored thereon that, when executed by the processing system, cause the system to:
   detect a flight initiation request;
   perform a preflight proximity scan with one or more sensors of a perception sensing system of the autonomous vehicle to detect any obstacles within a predetermined distance from the autonomous vehicle based on the flight initiation request;
   send an alert to a control station based on detection of at least one obstacle within the predetermined distance;
   identifying an estimated position of the at least one obstacle relative to an orientation of the autonomous vehicle based on which of the one or sensors detect the at least one obstacle;
   sending the estimated position of the at least one obstacle to the control station; and
   inhibit flight initiation of the autonomous vehicle until an acknowledgement of the alert is received.

8. The system of claim 7, wherein the perception sensing system captures one or more of an image or range to the at least one obstacle as obstacle data, and the instructions when executed by the processing system further cause the system to report the obstacle data to the control station.

9. The system of claim 7, wherein the instructions when executed by the processing system further cause the system to store a record of the at least one obstacle in a world model for a path planner of the autonomous vehicle to modify a path plan of the autonomous vehicle based on the at least one obstacle.

10. The system of claim 7, wherein the predetermined distance is defined by a sensing range of at least one of the one or more sensors of the perception sensing system or a minimum safe distance defined between the autonomous vehicle and any obstacle.

11. The system of claim 7, wherein the autonomous vehicle is an unmanned vertical takeoff and landing aircraft, and the flight initiation request is received from the control station or a vehicle computer system of the autonomous vehicle.

* * * * *